Figure 1:
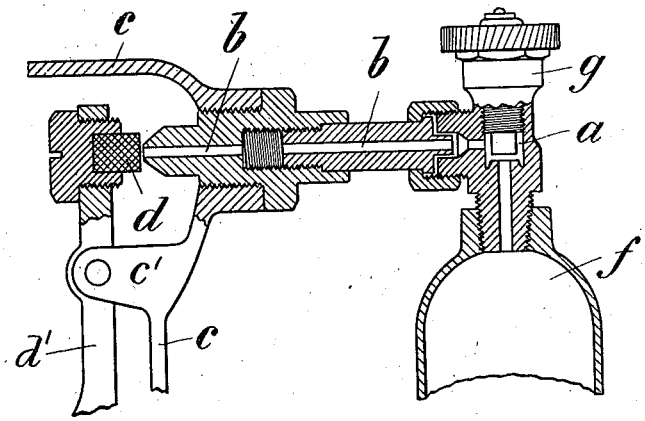

UNITED STATES PATENT OFFICE.

JOHANN HEINRICH DRÄGER AND ALEXANDER BERNHARD DRÄGER, OF LUBECK, GERMANY, ASSIGNORS TO THE FIRM OF DRÄGERWERK, HEINR. & BERNH. DRÄGER, OF LUBECK, GERMANY.

DEVICE FOR PREVENTING IGNITION OF PRESSURE-REDUCING VALVES.

979,936.   Specification of Letters Patent.   Patented Dec. 27, 1910.

Application filed June 7, 1909. Serial No. 500,690.

*To all whom it may concern:*

Be it known that we, JOHANN HEINRICH DRÄGER and ALEXANDER BERNHARD DRÄGER, subjects of the German Emperor, and residents of Lubeck, Germany, have invented certain new and useful Improvements in Devices for Preventing Ignition of Pressure-Reducing Valves, of which the following is a specification.

This invention relates to improvements in devices for preventing the ignition of the valve plate of vulcanite or the like in pressure reducing and similar valves for compressed gases, such as oxygen.

A safety device for preventing ignition and combustion of pressure reducing valves has already become known. Said device comprises a by-chamber or appendix arranged or attached to the gas passage at a point between the usual screw plug of the gas or oxygen cylinder and the valve plate of the pressure reducing valve. This appendix has the form of a "cul de sac" or of a socket to the extremity of which latter is suitably applied a pressure gage. The hollow space produced either by the appendix or by the socket, and situated some distance before the outlet opening of the gas passage, and constructed to have about the same width as the said gas passage serves as a by-chamber or by-corner into which the air contained in the gas passage is pushed or driven by the pressure gas rushing out of the gas cylinder on opening the screw plug valve of the latter. Although such safety devices have given good and satisfactory results, yet the possibility of ignition and combustion of the vulcanite valve plate of the pressure reducing valve is not absolutely excluded or prevented, because the air in front of the vulcanite valve plate is not entirely removed. This causes a division of the air, one part of the whole bulk of air being driven into the said appendix or socket, the other part of the air, especially the air contained in the part of the gas passage between the auxiliary or by-chamber and the vulcanite valve plate, being compressed against this valve plate, so that the possibility of the danger of ignition still subsists.

According to the present invention the above explained disadvantage of the well known safety device shall be obviated by arranging the auxiliary or by-chamber branching off from the gas passage in such a manner that the above cited division and partial compression of the air volume are entirely done away. This object is attained by arranging the by-chamber or its inlet coaxially with the passage through which the compressed gas such as oxygen is passed, so that all the air contained in the gas passage is driven into the by-chamber and only the driving means, *i. e.*, the compressed oxygen issuing from the gas cylinder is acting upon or against the vulcanite valve part, whereas the air is compressed in the by-chamber, where it finds no combustible body but metal walls or masses which will rapidly absorb its heat.

Figure 2:
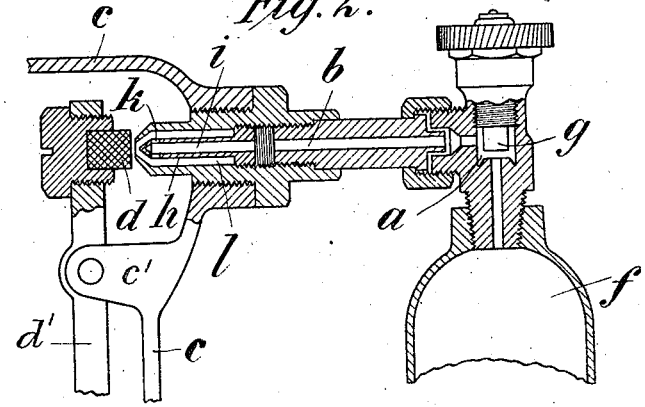

In the accompanying drawing: Figure 1 is a sectional elevation of the usual arrangement without a by-chamber. Fig. 2 is a sectional elevation of the novel arrangement with a by-chamber.

All the valves are shown in opened position and only so much of the gas cylinder and pressure reducing valve is shown as is necessary for a clear understanding of the invention.

In Fig. 1, $f$ designates a gas cylinder fitted with the usual screw-plug valve $g$ and from which the gas can pass out through the gas passage $b$ which communicates with a well known reducing chamber $c$, of which only a portion is shown, and in which chamber is mounted a pressure reducing valve having a valve part $d$ of vulcanite or like inflammable material mounted on one end of a controlling lever $d'$ which is pivoted on a bracket $c'$ on the wall of the reducing chamber. The controlling lever $d'$ is connected in the usual manner to a membrane (not shown) mounted in one end of the reducing chamber. This vulcanite valve part $d$ may be considered to represent the readily inflammable body above referred to. In this case the compression of the air or oxygen is produced, not by means of a physical piston as in the pneumatic igniter, but by the oxygen rushing suddenly out of the gas cylinder $f$ with great force into the space $a$ and the passage $b$. The air or oxygen in the space $a$ and passage $b$ is assumed to be under ordinary atmospheric pressure before the valve $g$ is opened, while the gas in the cylinder $f$ has a pressure of 100 atmospheres or more. If now the valve $g$ be opened suddenly, the highly compressed oxygen rushes into the spaces $a$ and $b$ and acting as a piston without mixing with the gaseous contents of these spaces, compresses these gaseous contents of the spaces $a$ and $b$ which have been hitherto at ordinary temperature and atmospheric pressure, suddenly to about one-hundredth part of their volume at the farthest end of the passage $b$, that is to say compresses them at the very spot where the readily inflammable body is situated, so that the quantity of heat contained in the original volume of the said gaseous contents of the spaces $a$ and $b$, is now concentrated suddenly in the extremely small space aforesaid. Now the increase in temperature which necessarily results according to well known physical laws at that spot is very great, and can be reduced only by the withdrawal of heat therefrom by any metal parts of greater or less thickness that may be situated near the vulcanite valve part. The vulcanite valve part will become ignited with the greater certainty the greater the surface presented by it to the heated gas, while its property of being a bad conductor of heat favors ignition. We have found that under these conditions ignition can be produced or prevented at will, and that there is a definite limit where ignition will not take place which can be determined so closely that a slight toughening of the surface of the vulcanite is sufficient to cause ignition with otherwise the same arrangement of the parts.

Fig. 2 shows the improved device applied to the outlet fitting of a gas cylinder containing highly compressed oxygen. In this arrangement a tubular part $h$ which may be formed in one piece with the fitting, is mounted in the fitting so that its bore $i$ forms a continuation of the gas passage $b$, as near as possible to the vulcanite valve part $d$. The nearer the outlet of the part $h$ is to the vulcanite valve part the greater the protection against ignition. The tubular part $h$ may have its outlet constituted by a number of lateral openings $k$. An annular air chamber $l$ is provided around the tubular part $h$; it serves to receive the displaced compressed air or gas. The size of this chamber $l$ depends on the capacity of the spaces $a$ and $b$ and the pressure conditions. The heated air or gas compressed into the chamber $l$ comes therein in contact with a large surface of metal whereby it is cooled quickly and safely.

We claim:—

1. In a device of the character described, the combination with a pressure chamber having an outlet passage and a pressure reducing valve controlling the latter, of a by-chamber communicating and being arranged coaxially with the said outlet passage for the reception of the air discharged therefrom.

2. In a device of the character described, the combination with a pressure chamber, of a discharge conduit communicating therewith closed at its end and provided with radial apertures, a member surrounding the discharge conduit forming a coaxial annular chamber communicating with the latter through said apertures, and a pressure reducing valve to control the annular chamber.

3. In a device of the character described, the combination with a pressure cylinder, of a discharge conduit communicating therewith closed at its end and provided with radial apertures, a sleeve forming an annular coaxial chamber surrounding the conduit to receive gas discharged from said apertures, and a pressure reducing valve to control the exit port of the sleeve.

JOHANN HEINRICH DRÄGER.
ALEXANDER BERNHARD DRÄGER.

Witnesses:
FREIDRICH PLATH,
JOHS. WULF.